United States Patent [19]

Satoh et al.

[11] Patent Number: 4,727,445
[45] Date of Patent: Feb. 23, 1988

[54] DEVICE FOR OPENING/CLOSING A PROTECTIVE COVER ON A MAGNETIC TAPE CASSETTE AND PROTECTING THE CASSETTE INTERIOR FROM CONTAMINATION

[75] Inventors: Takateru Satoh; Haruo Shiba; Kimio Tanaka; Yoshiya Sakata, all of Nagano, Japan

[73] Assignee: TDK Corporation, Japan

[21] Appl. No.: 810,021

[22] Filed: Dec. 17, 1985

[30] Foreign Application Priority Data

Dec. 17, 1984 [JP] Japan .............................. 59-191245[U]

[51] Int. Cl.⁴ .......................................... G11B 23/087
[52] U.S. Cl. .................................................... 360/132

[58] Field of Search ......................... 360/132; 242/198

[56] References Cited

U.S. PATENT DOCUMENTS 4,519,521  5/1985  Yoshii .................................. 360/132

Primary Examiner—Robert S. Tupper
Attorney, Agent, or Firm—Steinberg & Raskin

[57] ABSTRACT

A resiliently-mounted protective cover mounted on a magnetic tape cassette is controllably moved between exposed and protected positions along substantially the same path of movement during each use of the cassette. Blocking walls are provided in the interior of the cassette for preventing contaminants from reaching and contacting the magnetic tape therein.

13 Claims, 6 Drawing Figures

DEVICE FOR OPENING/CLOSING A PROTECTIVE COVER ON A MAGNETIC TAPE CASSETTE AND PROTECTING THE CASSETTE INTERIOR FROM CONTAMINATION

BACKGROUND OF THE INVENTION

1. Field of the Invention

The present invention generally relates to a tape cassette of the type used for electromagnetically recording digital signals on magnetic tape and, more particularly, to a resiliently-mounted protective cover mounted on the cassette for protecting such magnetic tape from contaminants which may enter the cassette and compromise tape performance.

2. Description of the Prior Art

It is well known in the prior art to record analog signals on magnetic tape housed in a cassette which is insertable into a conventional recording/playback apparatus having a magnetic head which reads the analog signals and converts the same into sound and/or video output signals. It is also well known to record digital signals on so-called "floppy discs" having an opening which is accessed by the magnetic head.

Although generally satisfactory for their intended purpose, there are problems associated with the use of floppy discs. For example, a user, through inadvertence, inexperience or deliberate action, may roughly handle the disc and touch the playing surfaces of the disc through the aforementioned access opening. The user may thus leave his fingerprints, outlined by oil, grease and water deposits, on the playing surfaces. Dust, dirt and other contaminants may enter via the access opening to adhere to the playing surfaces of the disc and, of course, such contaminants are particularly attracted to the fingerprint-marked areas. Such contaminants, of course, compromise tape performance. In addition, the non-rigid nature of the highly flexible floppy discs renders their handling much more difficult and awkward, as compared to rigid discs.

In an attempt to resolve the problems associated with floppy discs, the prior art has recently proposed using a magnetic tape cassette of the type exemplified in FIGS. 5 and 6 for recording digital signals. This prior art cassette comprises an upper rectangular casing 1 and a lower rectangular casing 2, each molded of a synthetic resin plastic material, and both joined together to form a cassette housing having an open front side. A magnetic tape 3 is mounted in the interior of the housing for travel between a pair of rotary reels 4, 5. The magnetic tape 3 is wound around the reel 4 and is sequentially advanced past a guide roller 6, a tape pad 7, another guide roller 8, and the other reel 5 in conventional manner. The tape 3 is advanced in a taut state past the open front side of the cassette housing during recording/playback operation.

It is also known to provide a protective cover 9 for covering the length of the magnetic tape 3 which is located at the front side of the cassette housing. The cover 9 is pivotably mounted on the housing for movement between an exposed position in which the cover 9 is remote from the tape at the front side of the housing, and a covered position in which the cover 9 overlies the tape at the front side of the housing. In the covered position, the cover 9 prevents dust, dirt and other contaminants, as well as the user's fingers, from entering the open front side of the housing and contacting the magnetic tape thereat. The aforementioned contaminant problem is very acute in the case of recording digital signals because the digital signals are recorded on much smaller lengths of the tape, as compared to recording analog signals. Put another way, the density of the digital signal is higher than that for the analog signal.

As shown in FIGS. 5 and 6, the protective cover 9, which advantageously is made of a suitable resin material, has an elongated planar main portion extending along the length of the open front side of the housing, and a pair of arm portions 91 and 92 at opposite end regions of the main portion and extending perpendicularly thereof. A pair of stub shafts 93, 94 are connected on the arm portions and are colinearly arranged along a pivot axis around which the cover 9 pivots in either circumferential direction. The shafts 93, 94 are inserted with clearance into triangular, oversized bearing holes which are formed in opposite side wall portions of the upper and lower casings 1 and 2. For example, side wall portion 201 is formed in lower casing 2. Each bearing hole is formed by combining a pair of notches which are formed in abutting edges of the side wall portions.

As shown in the covered position illustrated in FIG. 5, the conventional protective cover 9 covers a taut length of the magnetic tape 3 at the open front side of the cassette housing to close the cassette when the same is not in use. Consequently, there is no danger that the user's fingers and/or contaminants will contact the magnetic tape 3 and compromise the integrity and true reproduceability of the recorded digital signals. Each time the cassette is to be used, the cassette is inserted into a slot provided in the recording/playback apparatus, and a setting mechanism, including a set pin, within the slot is operative for pushing the cover slightly forwardly to clear the front side of the housing, and also for pivoting the protective cover 9 about the pivot axis to position the cover in the upper exposed position shown in FIG. 6 in which the main portion of the cover is located above the upper casing 1. Once the cover 9 is moved away from its overlying position with respect to the tape 3, then the cassette can be used to play/record the tracks on one side of the cassette. To play/record the tracks on the opposite side of the cassette, the cassette is removed from the aforementioned slot; the cover is returned to the covered position, and then the cassette is inverted and re-inserted, whereupon the cover is moved to the exposed position, but this time, the main portion of the cover is located above the casing 2.

Each of the reference numerals 10 designates a hole in which the aforementioned set pin is inserted. Each of the reference numerals 11 designates a tape end detecting hole into which is inserted a light-emitting element or a light-receiving element of the tape recording/playback apparatus. Each of the reference numerals 12, 13 designates a hole into which is inserted a capstan drive of the apparatus. The numeral 14 designates a shield plate.

Although the above described cassette with its protective cover has proven to be generally satisfactory for its intended purpose of protecting the tape at the front side of the housing from being contacted by fingers and/or contaminants, recent trends toward smaller and smaller cassette sizes have complicated the task of opening and closing the cover. The movement of the cover between its exposed and covered positions has heretofore not been sufficiently controlled such that the cover movement has not been altogether repeatable or predictable along the same trajectory. There is less and less space within the ever-increasingly miniaturized cassette to provide control elements capable of reliably controlling the cover movement. Also, the cover must be moved within a tightly controlled volume of space within the slot of the apparatus so as to avoid jamming or mechanical interference with other parts of the apparatus.

In addition, the aforementioned contaminant problem still remains. More particularly, experience has shown that, over the course of time, powder is produced and deposited on the tape within the cassette housing, thereby compromising tape performance. The powder is produced during the moving of the cover 9 between its various positions. The outer surfaces of the stub shafts 93 and 94 frictionally engage and, over time, grind down the inner surfaces of the bearing holes, thereby producing a ground powdery substance of synthetic resin material. The bearing holes, which extend through the side wall portions of the cassette, serve as passages along which the thus-produced powder may enter the interior of the housing. The contaminant-entry problem is aggravated not only by the fact that the stub shafts 93, 94 are inserted from the exterior of the cassette housing through the side wall portions into the interior of the housing, but also by any control elements located within the cassette housing and engaging the stub shafts, thereby producing more ground powder at the stub shafts and in the bearing holes. The thus-introduced powder eventually deposits onto the magnetic tape and mars subsequent tape performance.

SUMMARY OF THE INVENTION

1. Objects of the Invention

It is a general object of the present invention to overcome the aforementioned drawbacks of the prior art.

It is an additional object of the invention to controllably move a protective cover on a cassette along substantially the same path of movement during each use of the cassette.

It is another object of the invention to controllably and reliably move the protective cover during each use of the cassette along a path which closely hugs the exterior of the cassette and which lies within a relatively narrow volume of space.

It is yet another object of the invention to reliably prevent contaminants and/or fingers from contacting the magnetic tape mounted in the interior of a cassette housing.

It is a further object of the invention to prevent powder produced in the bearing holes for mounting a protective cover on the cassette from entering the interior thereof.

It is still another object of the invention to improve tape performance in a magnetic tape cassette of the type used for recording digital signals.

2. Features of the Invention

In keeping with these objects, and others which will become apparent hereinafter, one feature of this invention resides, briefly stated, in a magnetic tape cassette which comprises a housing having wall portions bounding an interior and an open front side, and means for mounting magnetic tape in the interior of the housing for travel in a taut state past the front side of the housing during each use of the cassette.

A protective cover is mounted on the housing for movement during each use between an exposed position in which the cover is remote from the front side of the housing and exposes the tape thereat, and a protected position in which the cover overlies the front side of the housing to protect the tape thereat.

In accordance with this invention, biasing means are provided in the interior of the housing. The biasing means is in resilient engagement with the cover, and is operative for constantly urging the cover toward the exposed and protected positions, and also for resiliently yielding during movement between the exposed and protected positions. Thus, the cover is controllably and reliably moved along substantially the same path of movement during each use of the cassette. The path of movement is in close adjacent confronting relationship with the front and top sides of the cassette, and closely hugs the exterior of the cassette within a relatively narrow volume of space to avoid jamming with other parts of a playback/record apparatus.

In a preferred embodiment, the cover includes a pair of stub shafts mounted on the cover, and colinearly arranged along a pivot axis. The stub shafts are pivotably mounted with clearance in two bearing openings extending through two side wall portions of the housing. The biasing means includes a biasing spring for each stub shaft. During the controlled movement of the cover between its positions, the cover not only pivots in either circumferential direction about the pivot axis, but also moves in either transverse direction, i.e. either forwardly or rearwardly, of the front side of the housing.

Each spring is advantageously of the double-armed type, and each spring is shaped to have a generally triangular configuration such that an intermediate portion of each spring lies in a vertical plane against a front wall of the housing, and the two arms of each said spring intersect and extend past each other to form a junction at which the respective stub shaft is resiliently engaged.

Another feature of this invention is embodied in a blocking means provided in the interior of the housing and operative for preventing contaminants from entering the housing. In a preferred embodiment, the aforementioned bearing openings for the cover stub shafts serve as a passage along which contaminants may enter the interior of the housing and eventually contact the tape and mar subsequent tape performance. Such contaminants may be generated by the aforementioned grinding or rubbing action between the springs and the stub shafts, and/or between the stub shafts and the bearing openings.

Advantageously, the blocking means may constitute a pair of partitions, each connected to the wall portions of the housing at opposite end regions of the front side of the housing. The partitions subdivide the interior of the housing into a tape-receiving compartment in which the tape is received, and a pair of contaminant-receiving compartments in which such contaminants are received. The partitions prevent communication between the tape-receiving compartment and a respective contaminant-receiving compartment.

Each partition is advantageously of one-piece molded construction with the housing. In the case where the housing has upper and lower casings connected together in an assembled condition, then each partition may advantageously include upper and lower partition portions respectively connected to the upper and lower casings and engaging each other in the assembled condition. In this case, each partition portion has a height corresponding to the height of the side wall portions of each casing.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Figure 5:
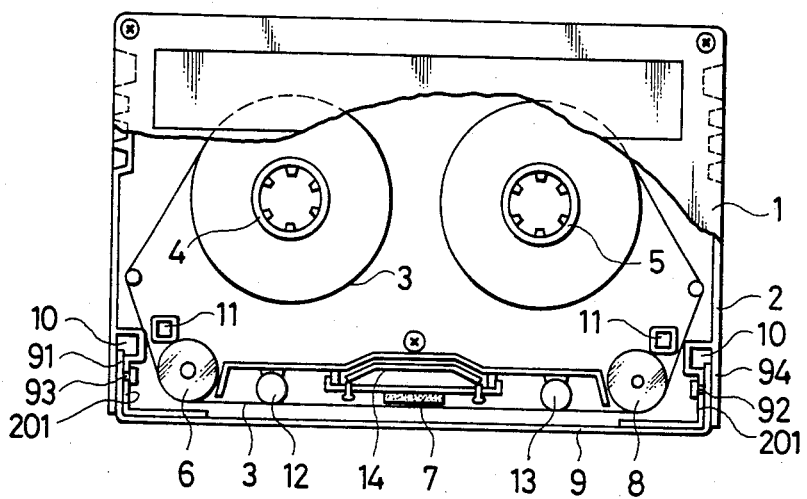
FIG. 5 is a partially broken-away top plan view of a conventional magnetic tape cassette according to the prior art.
Figure 6:
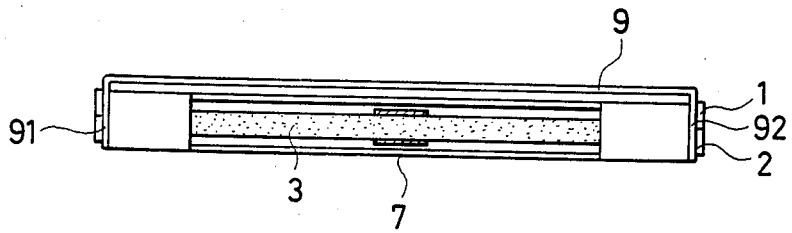
FIG. 6 is a front view of the prior art cassette of FIG. 5.

Referring now to the invention as illustrated in FIGS. 1-4, like reference numerals have been employed to designate like parts as in the prior art cassette described above and illustrated in FIGS. 5 and 6. Hence, a description of the structure and function of such like parts is not believed to be necessary and has been omitted for the sake of brevity.

In FIGS. 1-4, the upper and lower casings 1 and 2 respectively have side wall portions 101, 201 in which bearing holes (see reference numeral 17 in FIG. 2) are formed therethrough. Each bearing hole 17 is formed by generally triangularly-shaped notches 103, 203 cut out of abutting edges of the side wall portions 101, 201. The upper and lower casings 1, 2 also have front wall portions 102, 202, respectively, which bound the open front side of the housing. The notches 103,203 at each bearing hole 17 receive with clearance the stub shafts 93, 94 for movement not only in either circumferential direction about the pivot axis defined by the stub shafts, but also in either transverse direction toward and away from the front wall portions 102, 202.

In accordance with this invention, the movement of the stub shafts 93, 94 and, hence, of the cover 9, is controlled not only at, but also between, the end limiting exposed and protected positions. Biasing means are provided within the housing and in resilient engagement with the cover 9. The biasing means is operative for constantly urging the cover toward the exposed and protected positions, and for resiliently yielding during movement between the exposed and protected positions. Thus, the cover is controllably moved along substantially the same path of movement during each use of the cassette.

Figure 1:
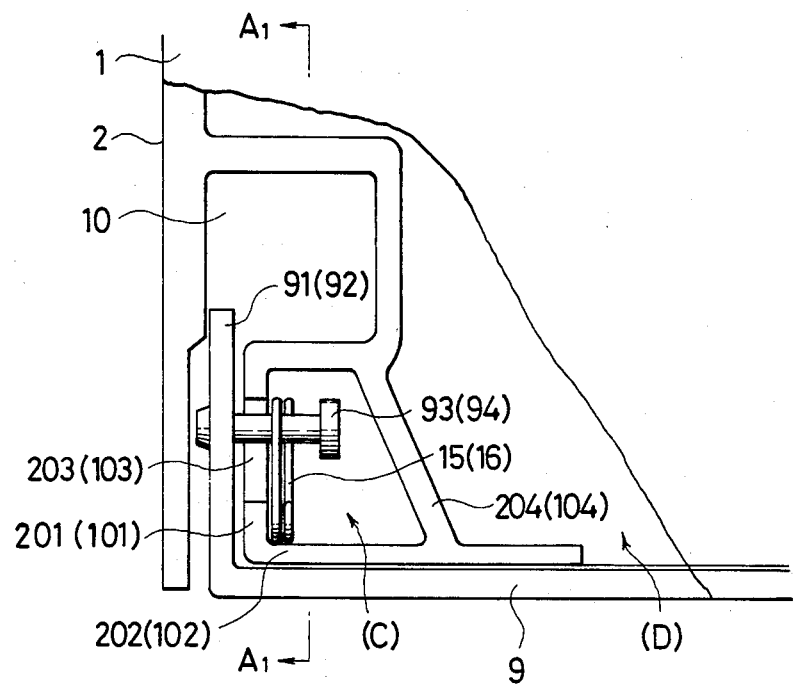
FIG. 1 is a partially broken-away top plan view of a front end corner region of a magnetic tape cassette according to the present invention.
Figure 2:
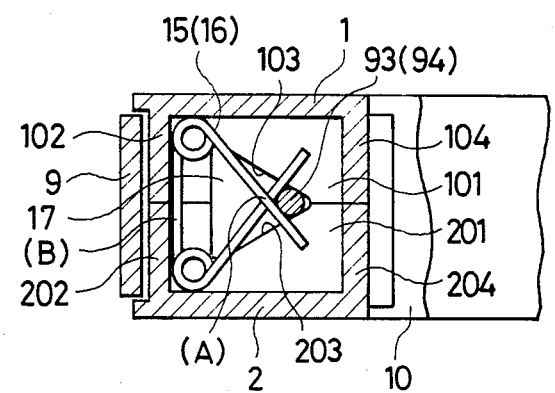
FIG. 2 is a sectional view taken along the line $A_1$—$A_1$ of FIG. 1.

In a preferred embodiment, the biasing means comprises a pair of springs 15, 16 for the stub shafts 93, 94. Each spring is of the double-armed type and, as shown in FIG. 2, includes an intermediate region or base B and a pair of free arms A at opposite ends of the base B. Each spring is mounted relative to a respective stub shaft such that the base B lies in a vertical plane and abuts against interiorly-facing vertical surfaces of the front wall portions 102, 202. The two free arms A of each spring intersect and extend past each other to form a cross-over junction at which the respective stub shaft is resiliently engaged. Each spring has coils provided between the base and the arms, the coils being held in the corners formed between the front wall portions 102, 202 and top and bottom wall portions of the upper and lower casings 1, 2, respectively.

In the assembled condition of the cassette shown in FIG. 2, the free arms A of each spring 15, 16 are normally operative to urge the respective stub shaft rearwardly of the front wall portions 102, 202 toward a rearmost position within the bearing hole 17. This is the position assumed by the stub shaft not only in the protected position shown in FIG. 2, but also in the exposed position shown in FIG. 4. The tension in the springs 15, 16 ensures that the stub shafts will be reliably maintained in said rearmost position, and that the cover 9 itself will be reliably maintained in either one of said exposed and protected positions.

Figure 3:
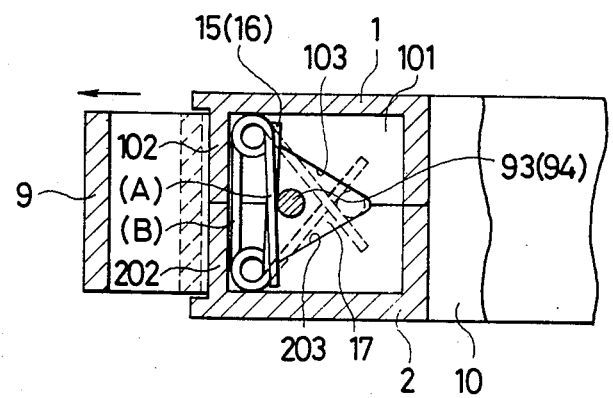
FIG. 3 is a view analogous to FIG. 2, but showing an initial part of the movement of the cover from its protected to its exposed position.

Turning now to FIG. 3, the controlled movement of the cover 9 away from the protected position of FIG. 2 is illustrated with the aid of phantom lines. Once the cassette has been inserted into a slot provided in a playback/record apparatus of conventional design, the aforementioned set pin is received within hole 10 and, thereupon, the setting mechanism is operative to urge the cover 9 in the direction of the arrow illustrated in FIG. 3 forwardly of the front wall portions 102, 202 until the cover 9 is clear of the front wall portions. At the same time, the stub shafts 93, 94, which participate in the forward movement of the cover 9, pull against the free arms A of the springs 15, 16 and place the springs under increased tension. In effect, the free arms A resiliently yield while at all times maintaining tension on the stub shafts.

Figure 4:
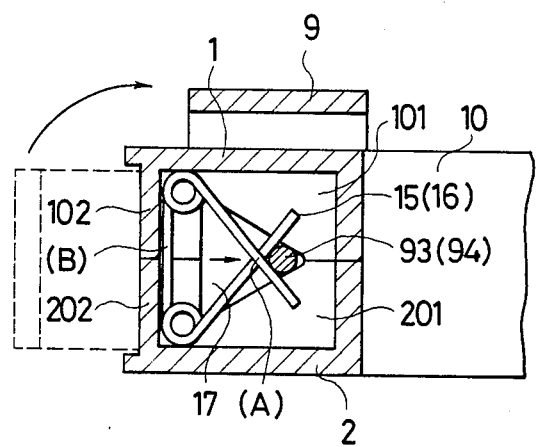
FIG. 4 is a view analogous to FIG. 2, but showing a subsequent part of the movement of the cover from its protected to its exposed position.

Turning now to FIG. 4, during further operation of the setting mechanism of the apparatus, the cover 9 is pivoted upwardly in the circumferential direction indicated by the curved arrow in FIG. 4. During this pivoting movement, the stub shafts 93, 94 are returned to their original rearmost position within each bearing hole 17 due to the restoring action of the free arms A of the springs 15, 16.

Hence, the springs 15, 16 enable the cover to be moved along a predictable path within a narrow volume of space and repeatedly along the same path of movement. The path of movement closely hugs the upper front edge region of the cassette and presents no mechanical interference with other parts of the apparatus. It will be appreciated that a relatively large stroke, even for relatively small springs, may be obtained, in accordance with the present invention, by increasing the spring-force characteristic of the springs and/or by increasing the length of the free arms A.

Another feature of this invention resides in a pair of partitions 104, 204 (see FIG. 2) provided at each front end corner region of the housing and connected to the upper and lower casings 1, 2, respectively. The height of each partition 104, 204 is the same as that of the side wall portions 101, 201, or that of the front wall portions 102, 202, so that the lowermost surface of the partition 104 engages the uppermost surface of the partition 204 in the assembled condition of the housing. Each pair of partitions constitutes a blocking means provided within the interior of the cassette housing for preventing contaminants from the bearing holes 17 from entering and possibly contacting the magnetic tape 3 mounted in the interior of the housing. Each pair of partitions subdivides the interior of the housing into a contaminant-receiving compartment C in which contaminants are received, and a tape-receiving compartment D in which the magnetic tape 3 is received. Each pair of partitions prevents communication between the tape-receiving compartment D and each contaminant-receiving compartment C.

Consequently, even if the outer surfaces of the stub shafts 93, 94 frictionally engage and grind down the walls bounding each bearing hole 17 and produce a powder inside the respective bearing hole, and even if each pair of springs 15, 16 frictionally engage and grind down the outer surfaces of the stub shafts 93, 94 and produce a powder on the exterior surfaces of the stub shafts, the two pairs of partitions 104, 204 effectively prevent the thus-produced powder from entering the tape-receiving compartment D and, in fact, collect the thus-produced powder within each contaminant-receiving compartment C. With this source of contamination eliminated, tape performance is not degraded over time.

It will be understood that each of the elements described above, or two or more together, also may find a useful application in other types of constructions differing from the types described above.

While the invention has been illustrated and described as embodied in a cassette having resiliently-mounted protective cover, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A magnetic tape cassette comprising:
   (a) a housing having wall portions bounding an interior and an open front side;
   (b) means for mounting magnetic tape in the interior of the housing for travel in a taut state past the front side of the housing during each use of the cassette;
   (c) a protective cover mounted on the housing for movement during each use between an exposed position in which the cover is remote from the front side of the housing to expose the tape thereat, and a protected position in which the cover overlies the front side of the housing to protect the tape thereat; and
   (d) biasing means in resilient engagement with the cover, and operative for constantly urging the cover toward the exposed and protected positions, and for resiliently yielding during movement between the exposed and protected positions;
   wherein the housing wall portions include side wall portions having bearing holes extending therethrough;
   wherein the cover includes a pair of stub shafts colinearly arranged along a pivot axis and mounted with clearance in the bearing holes for movement circumferentially about the pivot axis and also in a transverse direction toward and away from the front side of the housing;
   wherein the biasing means resiliently engage the stub shafts, and constantly urge the latter along the transverse direction away from the front side of the housing toward the exposed and protected positions, and yield when the stub shafts are moved along the transverse direction toward the front side of the housing during movement between the exposed and protected positions;
   wherein the biasing means includes a biasing spring for each stub shaft, each spring having a base in supported engagement with the housing and two free arms in resilient engagement with the respective stub shaft,
   whereby the cover is controllably moved along substantially the same path of movement during each use of the cassette.

2. The cassette as defined in claim 1, wherein the cover has an elongated main portion extending along the front side of the housing, and a pair of arm portions at opposite end regions of the main portion, said stub shafts being mounted on the arm portions.

3. The cassette as defined in claim 1, wherein the two arms of each spring are arranged in mirror symmetrical relationship to each other.

4. The cassette as defined in claim 3, wherein the two biasing springs have their respective bases lying in vertical planes, and have their respective free arms extending toward and past each other to form a junction at which the respective stub shaft is resiliently engaged.

5. The cassette as defined in claim 4, wherein each biasing spring has a generally triangular configuration.

6. A magnetic tape cassette comprising:
   (a) a housing having wall portions bounding an interior and an open front side;
   (b) means for mounting magnetic tape in the interior of the housing for travel in a taut state past the front side of the housing during each use of the cassette;
   (c) a protective cover mounted on the housing for movement during each use between an exposed position in which the cover is remote from the front side of the housing to expose the tape thereat, and a protected position in which the cover overlies the front side of the housing to protect the tape thereat; and
   (d) biasing means in resilient engagement with the cover, and operative for constantly urging the cover toward the exposed and protected positions, and for resiliently yielding during movement between the exposed and protected positions;
   wherein the housing wall portions include side wall portions having bearing holes extending therethrough;
   wherein the cover includes a pair of stub shafts colinearly arranged along a pivot axis and mounted with clearance in the bearing holes for movement circumferentially about the pivot axis and also in a transverse direction toward and away from the front side of the housing;
   wherein the biasing means resiliently engage the stub shafts, and constantly urge the latter along the transverse direction away from the front side of the housing toward the exposed and protected positions, and yield when the stub shafts are moved along the transverse direction toward the front side of the housing during movement between the exposed and protected positions; and further comprising blocking means in the interior of the housing for preventing contaminants from entering through the bearing holes into the housing interior and coming into contact with the magnetic tape, whereby the cover is controllably moved along substantially the same path of movement during each use of the cassette.

7. The cassette as defined in claim 6, wherein the blocking means subdivides the interior of the housing into a tape-receiving compartment in which the tape is received, and a contaminant-receiving compartment in which contaminants are received.

8. The cassette as defined in claim 7, wherein the blocking means constitutes a pair of partitions for each stub shaft, each pair of partitions preventing communication between the tape-receiving compartment and a respective contaminant-receiving compartment.

9. The cassette as defined in claim 8, wherein each partition is of one-piece construction with the housing.

10. The cassette as defined in claim 8, wherein the housing has upper and lower casings connected together in an assembled condition, and wherein each pair of partitions includes an upper and a lower partition respectively connected to the upper and lower casings and engaging each other in the assembled condition.

11. The cassette as defined in claim 10, wherein each partition has a height corresponding to the height of the side wall portions of the housing.

12. A magnetic tape cassette, comprising:
(a) a housing having wall portions bounding an interior, and an elongated open front side;
(b) means for mounting magnetic tape in the interior of the housing for travel in a taut state past the front side of the housing during each use of the cassette;
(c) a protective cover having stub shafts colinearly arranged along a pivot axis, and being mounted on the housing for pivoting movement about the pivot axis, and also for translatory movement in a generally radial direction toward and away from the front side of the housing, between an exposed position in which the cover is remote from the front side of the housing to expose the tape thereat, and a protected position in which the cover overlies the front side of the housing to protect the tape thereat; and
(d) a pair of biasing springs in resilient engagement with the stud shafts, and operative for constantly urging the stub shafts in the radial direction away from the front side of the housing toward the exposed and protected positions, and for resiliently yielding during movement between the exposed and protected positions;

wherein each spring comprises a base in supported engagement with the housing and two free arms in resilient engagement with the respective stub shaft.

13. A magnetic tape cassette comprising:
(a) a housing having wall portions bounding an interior, and an elongated open front side;
(b) means for mounting magnetic tape in the interior of the housing for travel in a taut state passed the front side of the housing during each use of the cassette;
(c) a protective cover having stub shafts colinearly arranged along a pivot access, and being mounted on the housing for pivoting movement about the pivot axis, and also for translatory movement in a generally radial direction toward and away from the front side of the housing, between an exposed position in which the cover is remote from the front side of the housing to expose the tape thereat, and a protected position in which the cover overlies the front side of the housing to protect the tape thereat; and
(d) a pair of biasing springs and resilient engagement with the stub shafts, and operative for constantly urging the stub shafts in the radial direction away from the front side of the housing toward the exposed and protected positions, and for resiliently yielding during movement between the exposed and protected positions; and further comprising blocking means in the interior of the housing for preventing contaminants from contacting the magnetic tape mounted in the interior of the housing, said blocking means being operative for subdividing the interior of the housing into a tape-receiving compartment in which the tape is received, and a contaminant-receiving compartment in which comtaminants are received, said blocking means preventing communication between the tape-receiving compartment and the contaminant-receiving compartment.

* * * * *